United States Patent
O'Brien et al.

(10) Patent No.: US 7,473,010 B2
(45) Date of Patent: Jan. 6, 2009

(54) LIGHT COVER

(75) Inventors: Edwin W O'Brien, Filton (GB); Andy Yiasoumi, Filton (GB); David C Richardson, Filton (GB); Nathalie Plouzennec, Toulouse (FR)

(73) Assignee: AIRBUS UK Limited, Bristol (GB)

( * ) Notice: Subject to any disclaimer, the term of this patent is extended or adjusted under 35 U.S.C. 154(b) by 701 days.

(21) Appl. No.: 10/501,867

(22) PCT Filed: Jan. 24, 2003

(86) PCT No.: PCT/GB03/00258

§ 371 (c)(1),
(2), (4) Date: Jul. 20, 2004

(87) PCT Pub. No.: WO03/064919

PCT Pub. Date: Aug. 7, 2003

(65) Prior Publication Data

US 2005/0073844 A1    Apr. 7, 2005

(30) Foreign Application Priority Data

Feb. 1, 2002   (GB) ................. 0202299.4

(51) Int. Cl.
*F21V 9/04*   (2006.01)
(52) U.S. Cl. .................. 362/293; 362/509; 362/510

(58) Field of Classification Search .............. 362/293, 362/303, 307, 510; 359/359; 353/55
See application file for complete search history.

(56) References Cited

U.S. PATENT DOCUMENTS

| | | | | |
|---|---|---|---|---|
| 2,552,185 | A | * | 5/1951 | Koch .................... 353/20 |
| 3,255,342 | A | | 6/1966 | Seitz et al. |
| 3,650,808 | A | * | 3/1972 | Gagnon ................. 428/412 |
| 3,984,673 | A | * | 10/1976 | Gray .................... 362/293 |
| 4,495,549 | A | | 1/1985 | Carlson et al. |
| 4,845,599 | A | | 7/1989 | Lievin |
| 5,017,327 | A | * | 5/1991 | Bamber ................. 362/289 |
| 5,199,785 | A | | 4/1993 | Scholz |
| 5,285,363 | A | * | 2/1994 | Meuse ................... 362/293 |
| 6,482,281 | B1 | * | 11/2002 | Schmidt ................. 156/108 |

FOREIGN PATENT DOCUMENTS

| | | |
|---|---|---|
| GB | 1 502 729 | 3/1978 |
| JP | 2000-215851 | 8/2000 |
| WO | 01/46011 A1 | 6/2001 |

* cited by examiner

*Primary Examiner*—Jong-Suk (James) Lee
*Assistant Examiner*—Robert May
(74) *Attorney, Agent, or Firm*—Nixon & Vanderhye P.C.

(57) ABSTRACT

A light cover has a transparent element manufactured from polycarbonate and an infrared filter angled so as to reflect infrared radiation emitted from a light source way from both the transparent element and the light source.

7 Claims, 1 Drawing Sheet

LIGHT COVER

Figure 1:
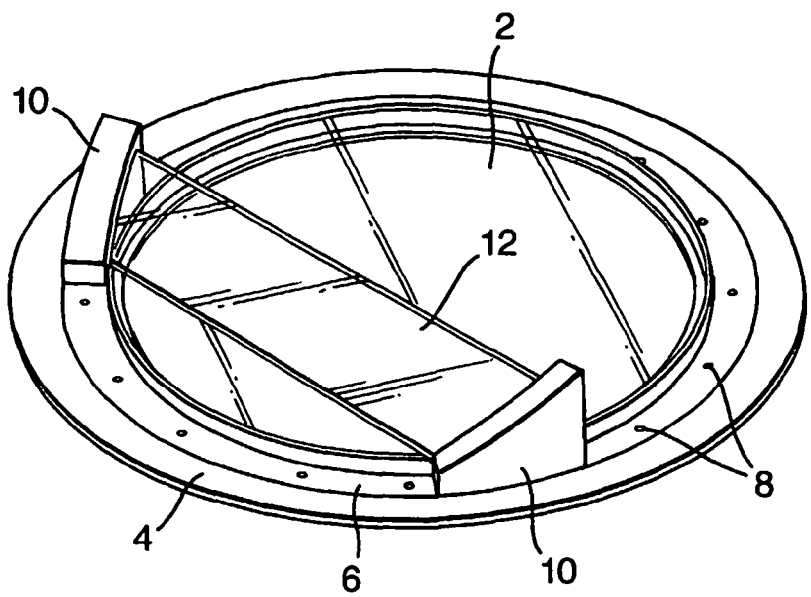

This application is the US national phase of international application PCT/GB03/00258 filed 24 Jan. 2003, which designated the US and claims priority to GB Application No. 0202299.4, filed 01 Feb. 2002. The entire contents of these applications are incorporated herein by reference.

The present invention relates to a light cover arranged to be placed over a light source, and in particular a light cover in combination with a reflective element.

It is common practice within the transport industry to place transparent covers over exterior light sources on moving vehicles or aircraft. As well as protecting the light sources from damage, such as from being hit by small stones or debris that may strike the moving vehicle from time to time, the covers allow good aerodynamic profiles to be achieved.

Within the aircraft industry, all exterior lights, such as navigation and landing lights, are required by safety legislation to have such covers. In particular, for aircraft landing lights the safety regulations stipulate that in the event that the light cover for the landing light is broken or cracked then the aircraft must not fly until the cover has been replaced.

This can prove problematic to both the aircraft operator and the aircraft manufacturer. It is clearly detrimental to the aircraft operator because of the direct cost of replacing landing light covers on a frequent basis, together with the indirect costs incurred due to the aircraft being temporarily out of service. Furthermore, in order to provide protection against the possibility of difficulties in sourcing or manufacturing sufficient quantities of light covers to satisfy the aircraft operators demand, for example because of industrial action, the aircraft manufacturer may need to hold large numbers of covers in stock, to the detriment of their cash flow.

At present this potential problem of second sourcing is exacerbated because the light covers are made of glass. Although glass has excellent optical qualities, the complex shapes often required for the light covers, due to the need to present a smooth aerodynamic surface, can be expensive to manufacture. Furthermore, glass is known to be a relatively brittle and inflexible material that can be broken by the stresses and strains that are inevitably transmitted to the light cover due to the flexing of the various aircraft surfaces even though strain relief is provided for the covers. Although transparent plastic materials are known that could be manufactured to the required shape and have the necessary strength and flexibility to withstand such stresses and strains without cracking or breaking, they have hitherto remained unused because they melt under the heat of the landing light bulb, the bulbs being typically 600 watts. It will, of course, be appreciated that the space available within an aircraft is restricted and hence the bulbs are relatively close to the cover. For example, a polycarbonate light cover for a 600 watt landing light bulb would melt in approximately 10 minutes. Although this would be permittable for emergency use, it is clearly not a viable proposition as a permanent solution.

According to a first aspect of the present invention there is provided a light cover arranged to be placed over a light source, the light source further emitting infrared radiation when in use, wherein the light cover includes a reflective element arranged to reflect a portion of the emitted infrared radiation away from the light cover.

Preferably the reflective element comprises an infrared reject filter. Preferably the reflective element is partially mirrored.

Preferably the light cover is manufactured from a synthetic material, such as a polycarbonate plastic. Preferably the light cover is coated with a scratch resistant layer such as Perspex (registered trade mark).

Preferably, said reflective element is further arranged to reflect said infrared radiation away from said light source.

Preferably the light cover is an aircraft exterior light cover.

According to a second aspect of the present invention there is provided a light assembly comprising a light source mounted within a housing, the light source emitting infrared radiation when in use, a light cover placed over said light source and a reflective element located between said light source and said light cover and arranged to reflect a portion of the emitted infrared radiation away from the light cover.

It is therefore possible to provide a light cover that is both strong and flexible enough so as to not be prone to cracking or breaking, and is capable of withstanding the heat generated from the light bulb.

Figure 2:
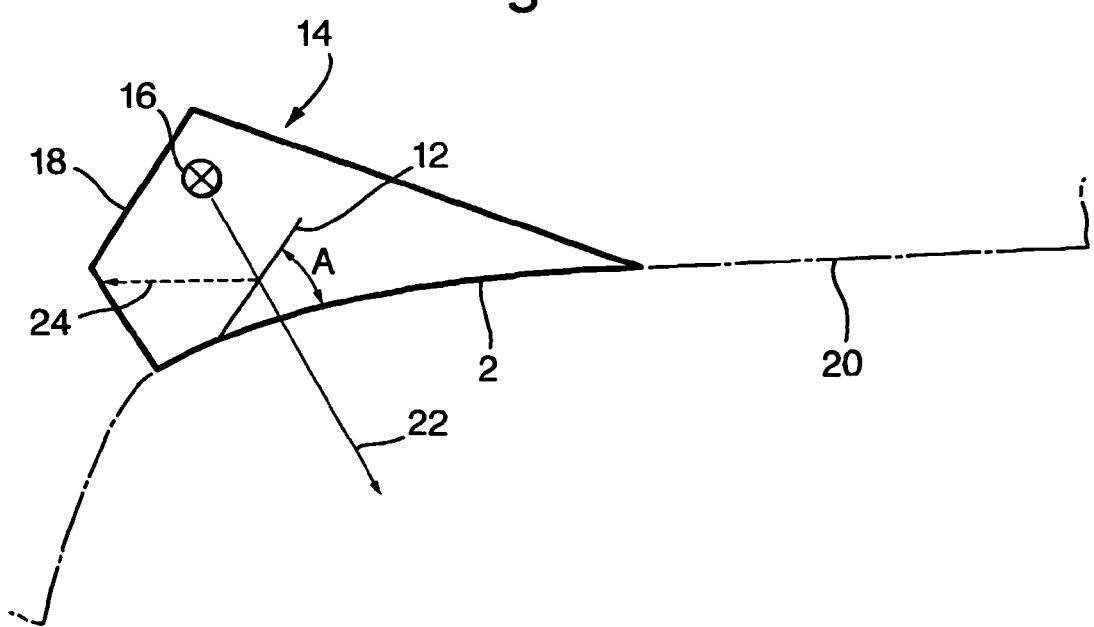

An embodiment of the present invention is described, by way of example only, with reference to the accompanying figures, of which:

FIG. 1 is a perspective view of a light cover according to an embodiment of the present invention; and FIG. 2 is a schematic representation of a light assembly including the light cover shown in FIG. 1.

FIG. 1 shows a perspective view of a light cover according to an embodiment of the present invention. The cover comprises a transparent element 2 that is substantially the size and shape of the required light cover. Transparent element 2 has a shaped periphery (not visible in FIG. 1) that is fastened between an outer mounting ring 4 and an inner fastening ring 6. The inner fastening ring 6 is secured to the outer mounting ring 4 using a number of screws or bolts 8, thus securely fastening the transparent element 2 between it and the outer mounting ring 4. The shaped periphery of the transparent element 2 is such that a smooth aerodynamic profile is presented by the exterior surface of the light cover.

Mounted on the inner fastening ring 6 are two filter support brackets 10. Attached to the filter support brackets 10 so as to span across a portion of the transparent element 2, is an infrared reject filter 12. Such filters are commercially available. The infrared filter 12, due to the configuration of the filter mounting brackets 10, is inclined to the surface of the transparent element 2.

FIG. 2 schematically illustrates the positioning and operation of a light assembly 14 incorporating a light cover as shown in FIG. 1. The light assembly 14 comprises a light source 16 mounted within a housing 18 and covered by a light cover, only the transparent element 2 of which is shown in FIG. 2 for clarity. The light assembly 14 is typically mounted within the wing and/or fuselage 20 of an aircraft.

The transparent element 2 of the light cover is preferably manufactured from polycarbonate, although other suitable synthetic materials may be used. Polycarbonate is a strong, transparent thermosetting plastic that can be moulded and/or machined to the complex shape required for the light cover, yet is flexible enough to withstand the stresses and strains transferred to the light cover from the wing and/or fuselage. As polycarbonate is extremely difficult to polish, and the exterior surface of the light cover is prone to being scratched due to dust abrasion, it is preferred that the exterior surface of the transparent element 2 is coated in Perspex (registered trade mark) or the like. Perspex is more easily polished, allowing the majority of the scratches to be polished out, thus extending the life of the light cover.

Referring back to FIG. 2, the arrow 22 represents a light ray from the light source 16. The light ray passes through the infrared filter 12 and the transparent element 2 to illuminate an area in front of the light assembly 14. The light source 16, which may typically be a 600 watt bulb, also emits a substantial amount of heat as infrared radiation. The infrared filter 12, which may be coated so as to render the filter 12 partially mirrored, reflects a substantial proportion of the infrared radiation, indicated by the chain arrow 24, towards the rear of the housing 18. Without the presence of the infrared filter 12, the heat emitted from the light source 16 would be sufficient to melt the polycarbonate transparent element 2 in approximately 10 minutes.

The angle of the infrared filter 12, indicated by angle A, is carefully selected to direct the reflected infrared radiation towards a non-critical part of the lighting housing 18 so as to avoid unwanted heating of a heat sensitive part of the assembly. It is important that the infrared radiation is not directed substantially back towards the light source 16, as this would cause the light source itself to overheat and fail. It will be appreciated that the infrared filter 12 may alternatively be secured to the housing 18 by suitable means whilst still reflecting infrared radiation away from the transparent element 2.

The present invention therefore provides a light cover incorporating or associated with a heat reflector that, with careful selection of the angle of the heat reflector, directs heat away from both the light cover itself and the light source. This allows plastics which have hitherto been precluded from use due to thermal problems to be used.

The invention claimed is:

1. A light cover arranged to be placed over a light source emitting infrared radiation, wherein said light cover comprises an aircraft exterior light cover, wherein the light cover includes a reflective element angled with respect to said light cover for reflecting a portion of said emitted infrared radiation away from said light cover and substantially away from said light source.

2. A light cover according to claim 1, wherein said reflective element comprises an infrared reject filter.

3. A light cover according to claim 1, wherein said reflective element is partially mirrored.

4. A light cover according to claim 1 wherein said light cover is manufactured from a synthetic material.

5. A light cover according to claim 4, wherein said synthetic material is polycarbonate.

6. A light cover according to claim 4, wherein said light cover is coated with a scratch resistant layer.

7. A light cover according to claim 1, wherein said reflective element is further arranged to reflect said infrared radiation away from said light source.

* * * * *